United States Patent
Mueller-Roemer

[11] Patent Number: 5,983,345
[45] Date of Patent: Nov. 9, 1999

[54] CIRCUIT FOR INITIALIZING AND MONITORING A MICROPROCESSOR

[75] Inventor: Gerhard Mueller-Roemer, Reutlingen, Germany

[73] Assignee: Robert Bosch GmbH, Stuttgart, Germany

[21] Appl. No.: 08/888,840

[22] Filed: Jul. 7, 1997

[30] Foreign Application Priority Data

Jul. 6, 1996 [DE] Germany ............. 196 27 362

[51] Int. Cl.$^6$ ................. G06F 9/06; G06F 11/30
[52] U.S. Cl. ................................. 713/1; 713/340
[58] Field of Search ................. 395/651, 652, 395/653, 551, 555, 558, 559, 560, 750.08, 750.01, 182.21; 713/1, 2, 100, 400, 500, 503, 600, 601, 340, 300; 714/45

[56] References Cited

U.S. PATENT DOCUMENTS

| | | | |
|---|---|---|---|
| 4,551,841 | 11/1985 | Fujita et al. | 395/182.21 |
| 4,696,002 | 9/1987 | Schleupen et al. | 395/182.21 |
| 4,803,592 | 2/1989 | Ashley | 361/79 |
| 4,803,682 | 2/1989 | Hara et al. | 395/182.21 |
| 5,073,853 | 12/1991 | Johnson | 395/182.21 |
| 5,297,287 | 3/1994 | Miyayama et al. | 365/651 |
| 5,361,365 | 11/1994 | Hirano et al. | 395/651 |
| 5,513,358 | 4/1996 | Lundberg et al. | 395/651 |
| 5,696,979 | 12/1997 | Saitou | 395/651 |
| 5,748,948 | 5/1998 | Yu et al. | 395/555 |
| 5,790,419 | 8/1998 | Matsuda et al. | 395/182.13 |

Primary Examiner—Kevin A. Kriess
Attorney, Agent, or Firm—Kenyon & Kenyon

[57] ABSTRACT

A circuit for initializing and monitoring the proper operation of a microprocessor. Both reset procedures, the power-on reset and the operating reset, are performed by a digital circuit.

5 Claims, 4 Drawing Sheets

5,983,345

1

CIRCUIT FOR INITIALIZING AND MONITORING A MICROPROCESSOR

FIELD OF THE INVENTION

The present invention relates to a process and a circuit for initializing and monitoring the proper operation of a microprocessor.

BACKGROUND INFORMATION

Techniques are known for monitoring the operating status of a processor. There are procedures known as "watchdog" procedures, in which the processor must signal its operating readiness through suitable feedback signals. All known watchdog procedures have, however, the disadvantage that they can cause the processor to be reset only in the case of a malfunction of the processor. These known watchdog procedures do not provide for initialization when the operating voltage appears, which is known as "power-on reset."

SUMMARY OF THE INVENTION

The process according to the present invention for initializing and monitoring a microprocessor has the advantage in that both a power-on reset when the operating voltage is applied to the processor and an operating reset when a malfunction of the processor occurs are carried out using the same circuit, which also detects the malfunction of the processor.

It is further advantageous that a toggle flip-flop, which controls the processor reset signal as a function of the operating voltage and the resulting response signals of the processor itself, is used.

No fixed time frame is defined for responding to a processor function scan, but the processor is told, through a query, when a response is expected. There are very few requirements regarding the response pulse period length tolerance. Great dynamic fluctuations in the input frequency are tolerated.

Furthermore, it is advantageous that the processor can check the watchdog query for correct function by checking the duration of the query period.

It is furthermore advantageous that the circuit can be implemented very easily, for example, as an integrated circuit.

DETAILED DESCRIPTION

Figure 1:
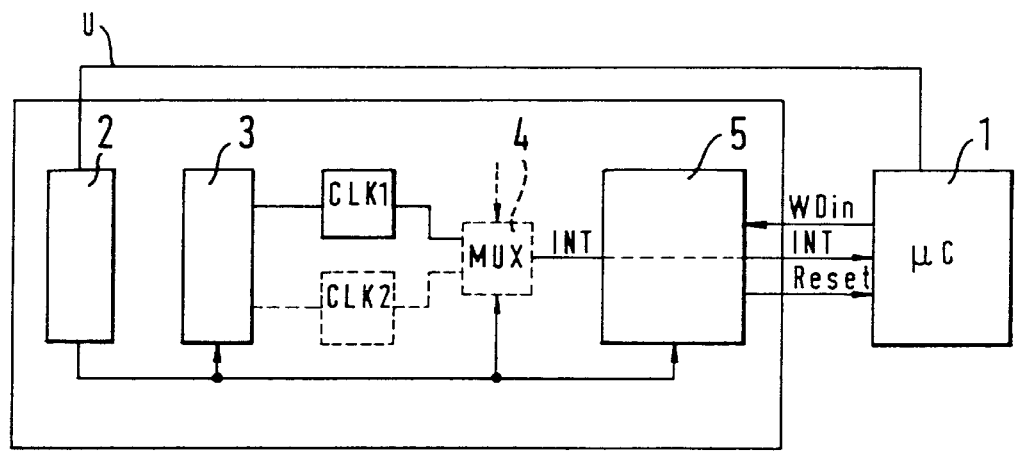
FIG. 1 schematically shows a circuit for monitoring a microprocessor, according to the present invention.

FIG. 1 schematically shows the circuit containing the microprocessor 1. Operating voltage U is applied to microprocessor 1. Low-voltage detector 2 detects the operating voltage U for processor 1. The low-voltage signal is used as a reset signal R for oscillator 3, multiplexer 4 (if present), and the digital circuit 5 according to the present invention. Thus, the reset conductor to the processor is defined as being at a low level after the operating voltage has been applied.

This low level means initialization of the processor when the operating voltage is applied, i.e., in the case of a power-on reset.

When low voltage is no longer detected, oscillator 3 begins to operate. Using multiplexers 4, different clock cycles (INT) can be made available to digital circuit 5 according to the present invention, if necessary. The INT signal is also made available to the processor at one input. The reset input of the processor is activated if a low level is detected. After the reset level has gone high, the microprocessor must continuously respond to the INT signal, or it is again subjected to a reset sequence.

Figure 2:
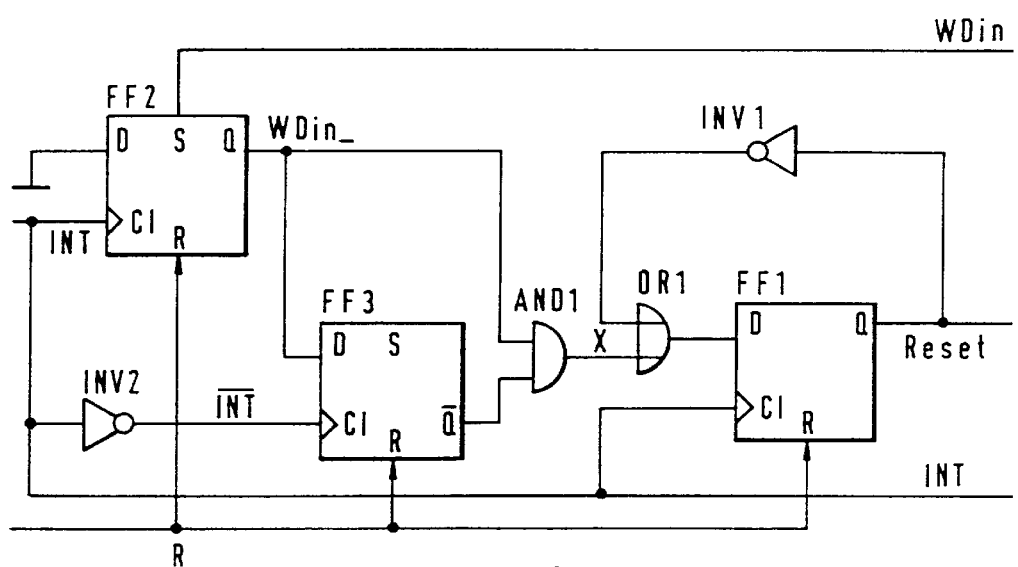
FIG. 2 shows a digital circuit according to the present invention.

This response to the watchdog query (WDin) must be given at the proper time. If the processor 1 makes an error during an INT period, it is reset in the next clock period for one clock period with a low level at the reset input. This operating reset occurs if the processor delivers no response, a mistimed response, or an incorrect response. FIG. 2 shows an embodiment of digital circuit 5 that results in a reset both when the operating voltage is applied and when the processor function is interrupted. The individual components of this circuit are explained in detail in FIGS. 3a, 3b, 4a, 4b and 5.

Figure 3A:
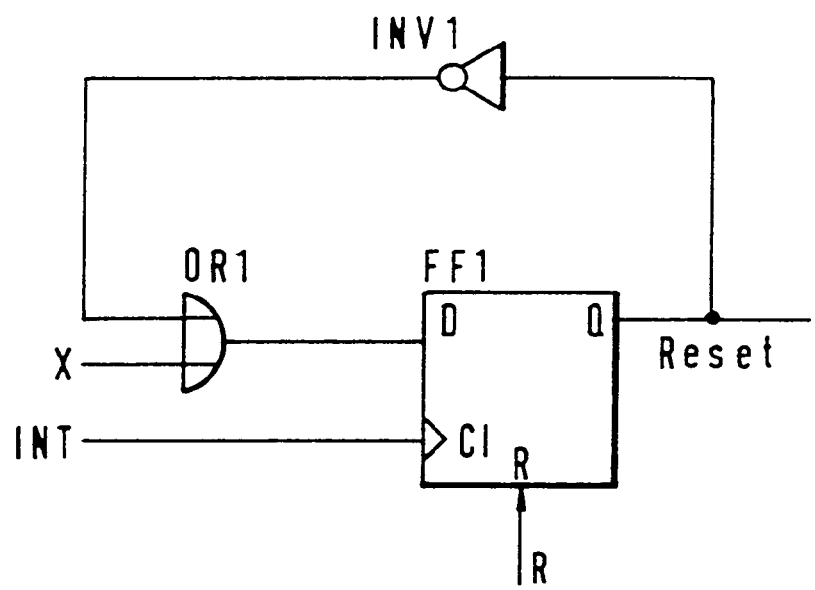
FIG. 3a shows a reset circuit according to the present invention.
Figure 3B:
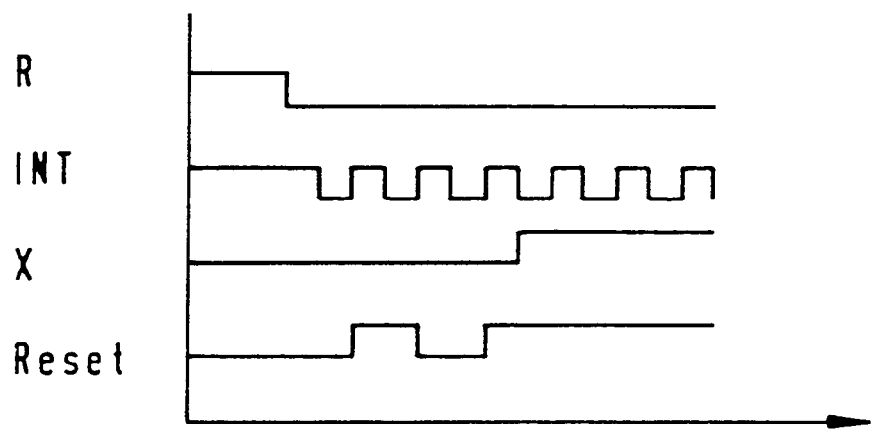
FIG. 3b shows an implementation of a reset signal in a timing diagram.

A toggle flip-flop FF1, switched low at its output Q after the low-voltage reset signal R has been lifted, is the core of the circuit illustrated in FIG. 3a for managing the power-on reset and the operating reset. Power-on reset is performed under these conditions, i.e., with the reset signal on low, which only change when the flip-flop changes status due to a positive INT edge between the high and low levels (see FIG. 3b). Then the flip-flop switches between high and low with each positive INT edge, unless this is prevented by a high signal at input OR1 during the positive INT edge. The high signal at the OR1 input is initialized by signal X, which is on high when the processor operates without errors.

To obtain input signal X for toggle flip-flop FF1, the microprocessor operation must be monitored. This monitoring is performed, for example, in two steps, the first part being represented in FIG. 4a. The INT signal is made available to the microprocessor 1, which is forced to respond to this signal within a certain time period, or it is reset by an operating reset. Two flip-flops are responsible for the microprocessor 1 acknowledging each high INT phase with one or more WDin pulses in the low INT phase so that it is not reset. The processor 1 is given the option to set flip-flop FF2 low with the WDin signal through set input S. Flip-flop FF2 is reset again with each positive INT edge if no permanent signal is applied, since its D input is on low. Output signal WDin_ja shows whether the response of the processor (WDin) was low.

Figure 4A:
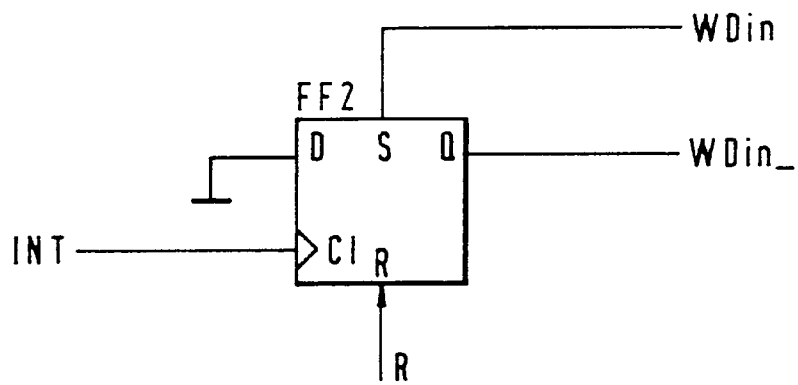
FIG. 4a shows a circuit for responding to the watchdog signal.
Figure 4B:
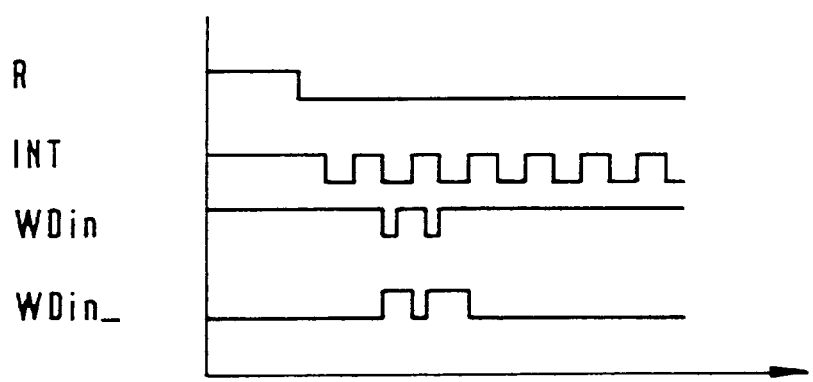
FIG. 4b shows an implementation of various signals in a timing diagram.
Figure 5:
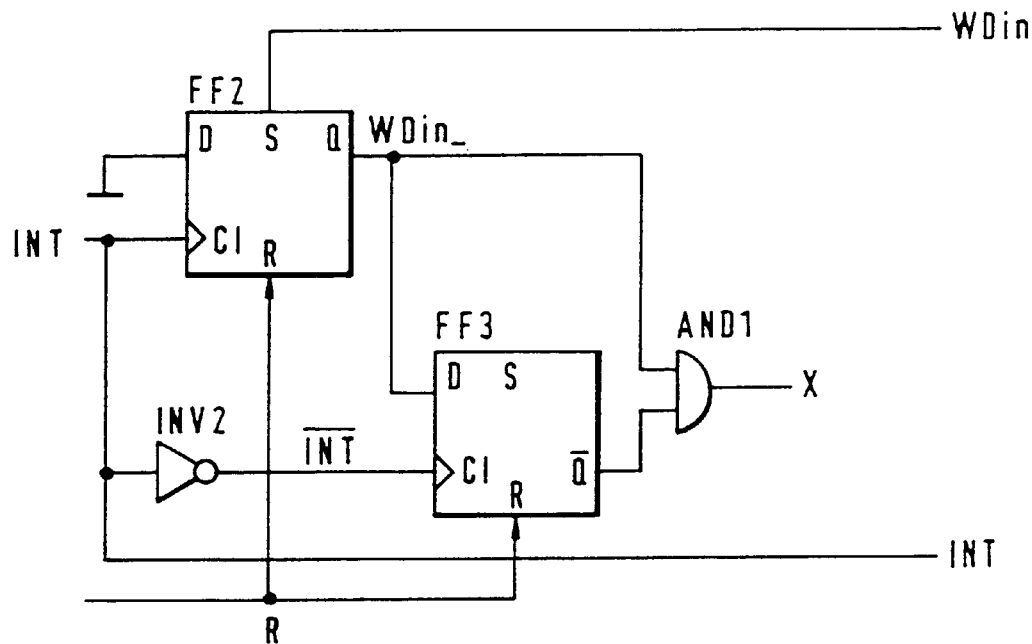
FIG. 5 shows a circuit that triggers an operational reset.

Previously, with the circuit of FIG. 4a, it was only determined whether the processor had sent a response signal. With flip-flop FF3 of FIG. 5, it is also determined whether the response was sent at the right time. Flip-flop FF3 determines whether the WDin pulse came during the high phase of the INT signal by assuming the status of flip-flop FF2 at output Q with each falling INT edge. Input signal X for the toggle flip-flop is obtained from signals Q of flip-flop FF2 and flip-flop FF3 through an AND gate. With this signal, the reset signal can be prevented from being set low for an operating reset with each rising INT edge.

Figure 6:
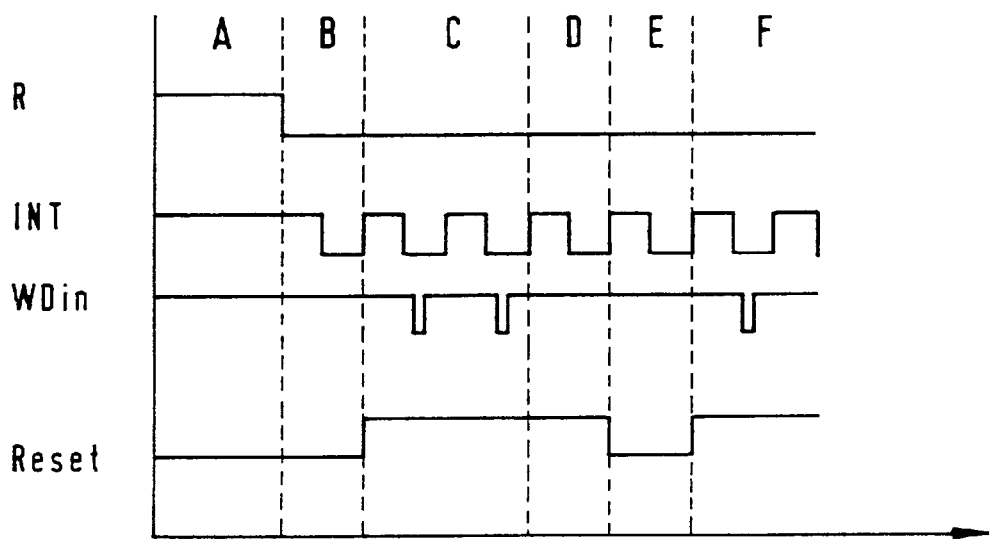
FIG. 6 shows a time variation of different signals.

FIG. 6 shows a typical sequence of two resets. In interval A, the operating voltage has not yet been applied. The low voltage display is on high level. In interval B, the low-voltage detector detects that the operating voltage has been applied and switches to low. At the same time, the internal clock INT starts running. Since no response has so far been received from the processor 1 in interval B, the reset level is set to low, and a power-on reset of the processor 1 is started. In interval C, the processor 1 starts responding to the incoming INT signal with the WDin signal. If the response is correct, the processor 1 is not reset, since the reset input is on high. If the processor 1 response to the query is incorrect, as in interval D, and no WDin signal is given, the reset input is set low during the next clock cycle and an operating reset is performed. In interval F, the system again operates without problems after an operating reset.

The circuit according to the present invention has the advantage that great input frequency fluctuations are tolerated. The processor 1 itself can check the proper operation of the watchdog by measuring the INT periods. The time window for responding to the INT signal can be selected. The hardware for the circuit according to the present invention is very simple.

What is claimed is:

1. A circuit for initializing and monitoring a proper operation of a microprocessor, comprising:

a digital circuit including a toggle flip flop generating a reset signal for the microprocessor, the toggle flip flop including a first input and a second input, the toggle flip flop generating the reset signal for the microprocessor when one of i) an undervoltage is detected at the first input, and ii) a fault signal is received at the second input, the fault signal being evoked by a malfunction of the microprocessor, the toggle flip flop being controlled periodically by a periodic time signal.

2. A circuit for initializing and monitoring a proper operation of a microprocessor, comprising:

a digital circuit including a toggle flip flop generating a reset signal for the microprocessor, the toggle flip flop including a first input and a second input, the toggle flip flop generating the reset signal for the microprocessor when one of i) an undervoltage is detected at the first input, and ii) a fault signal is received at the second input, the fault signal being evoked by a malfunction of the microprocessor, the toggle flip flop being controlled periodically by a periodic time signal, wherein the digital circuit applies a periodic query signal to the microprocessor, wherein the digital circuit includes an arrangement detecting the malfunction of the microprocessor and generating the fault signal as a function of detecting the malfunction of the microprocessor, and wherein the malfunction is detected if no response to the periodic query signal is issued by the microprocessor within a predetermined time period.

3. The circuit according to claim 2, wherein the predetermined time period for responding to the query signal is adjustable.

4. The circuit according to claim 1, wherein the microprocessor monitors the digital circuit for a correct operation by measuring a period of the periodic query signal.

5. The circuit according to claim 1, wherein the digital circuit is an integrated circuit.

* * * * *